Aug. 27, 1968

G. BERTOGLIO 3,398,503

FILLING AND CLOSING APPARATUS FOR BAGS OF THERMOPLASTIC MATERIAL

Filed Nov. 10, 1966

INVENTOR.
GUIDO BERTOGLIO
BY
Kurt Kelman
agent

Aug. 27, 1968  G. BERTOGLIO  3,398,503
FILLING AND CLOSING APPARATUS FOR BAGS OF THERMOPLASTIC MATERIAL
Filed Nov. 10, 1966  5 Sheets-Sheet 2

INVENTOR.
Guido Bertoglio
BY

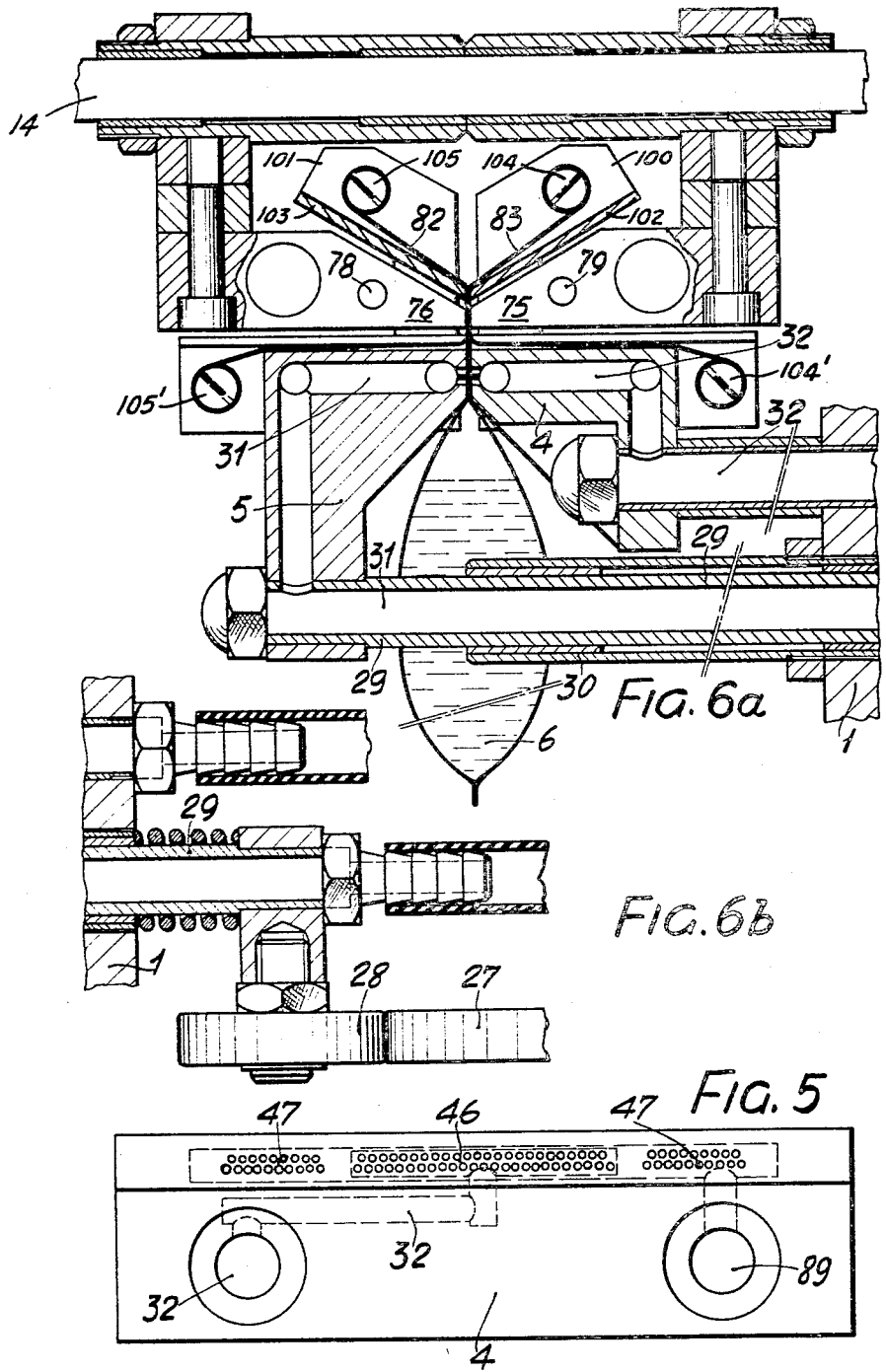

Aug. 27, 1968

G. BERTOGLIO 3,398,503

FILLING AND CLOSING APPARATUS FOR BAGS OF THERMOPLASTIC MATERIAL

Filed Nov. 10, 1966

INVENTOR.

GUIDO BERTOGLIO

BY

Kurt Kelman
agent

United States Patent Office 3,398,503
Patented Aug. 27, 1968

3,398,503
FILLING AND CLOSING APPARATUS FOR BAGS OF THERMOPLASTIC MATERIAL
Guido Bertoglio, 1 Via Quiete,
6962 Viganello, Switzerland
Continuation-in-part of application Ser. No. 331,182, Dec. 17, 1963. This application Nov. 10, 1966, Ser. No. 607,097
Claims priority, application Switzerland, Jan. 17, 1963, 587/63
7 Claims. (Cl. 53—187)

ABSTRACT OF THE DISCLOSURE

An apparatus for filling plastic bags with liquid in which ten filling stations equiangularly mounted on a turntable are each equipped with suction jaws for holding, opening and closing the bags and with a liquid dispensing pump. A rocker which travels back and forth in an arc coaxially with the turn table carries a feeder, a heat sealing station, a cooling station, and a discharge station which sequentially cooperate with the filling stations during continuous rotary movement of the latter. Cams and pneumatic devices operate the elements of the apparatus in timed sequence, and safety devices are provided to prevent spilling of liquid in the absence of a bag at the filling station.

---

This application is a continuation-in-part of my co-pending application Ser. No. 331,182, filed on Dec. 17, 1963, now abandoned.

The present invention relates to apparatus for filling plastic bags with metered amounts of material and for automatically closing the bags in a continuous cyclic process.

The invention, in one of its aspects, resides in an apparatus of the type referred to above in which a turn table is mounted on a support for rotation at uniform speed about a vertical axis by suitable drive means. Filling stations which are circumferentially spaced on the turn table each include two jaws for gripping a bag therebetween and having suction openings. The jaws are moved toward and away from each other in timed sequence in response to rotation of the turn table, and air is drawn inward through their suction openings. Each filling station further has a metering device which includes a container, such as a cylinder, adapted to receive the material to be filled into the plastic bags, a discharge nozzle for discharging the material into a bag held by suction to the jaws while the same are spaced apart, and a valve which alternatingly connects the container to a source of the material or to the nozzle. The valve is operated by a cam arrangement in response to rotation of the turn table. A rocker member which is mounted on the support for rocking movement about the afore-mentioned axis carries a bag feeding device, a bag welding device, a bag cooling device, and a bag discharging device which respectively feed empty bags to the jaws, weld the top of a filled bag, and cool the welded bag while held by the jaws, and discharge the cooled bag from the filling station. The rocker member is oscillated about its axis in such a manner that it moves in unison with the turn table during one stroke of its oscillating movement. The suction applied to the openings of the jaws is controlled in response to the rotation of the turn table.

The accompanying drawings show a preferred embodiment of the present invention.

Figure 1:
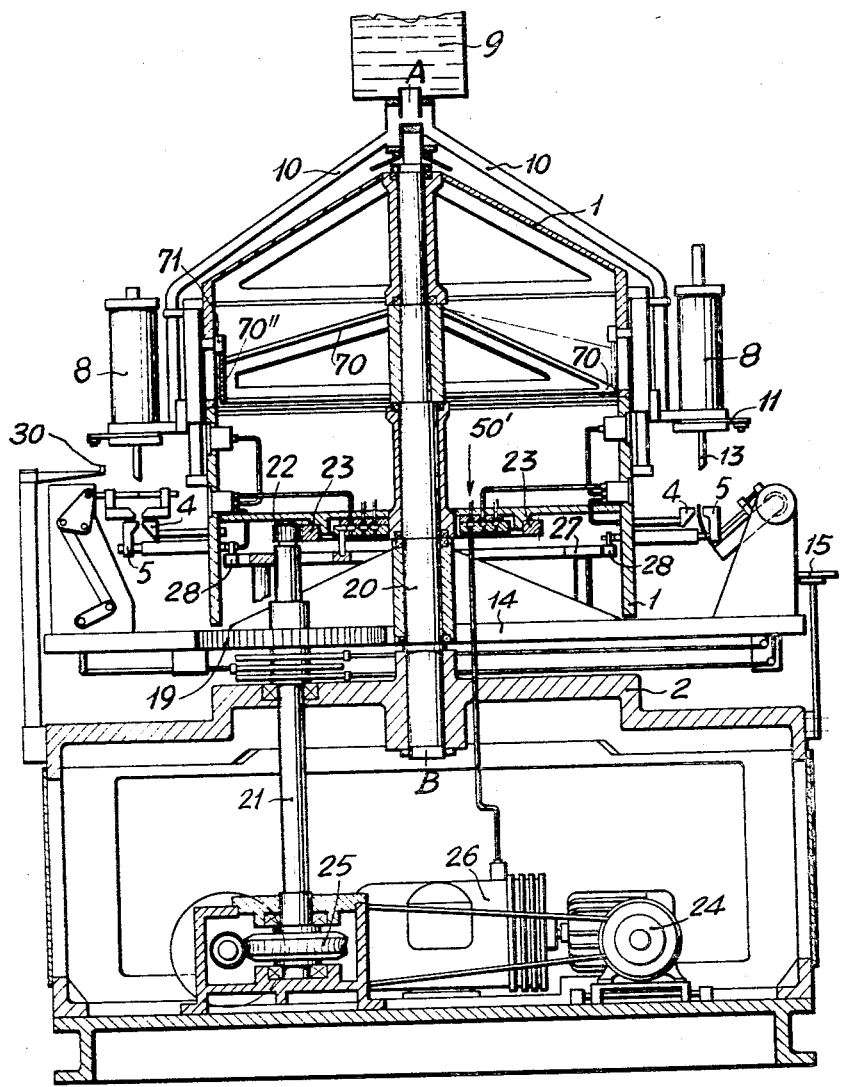
Figure 2:
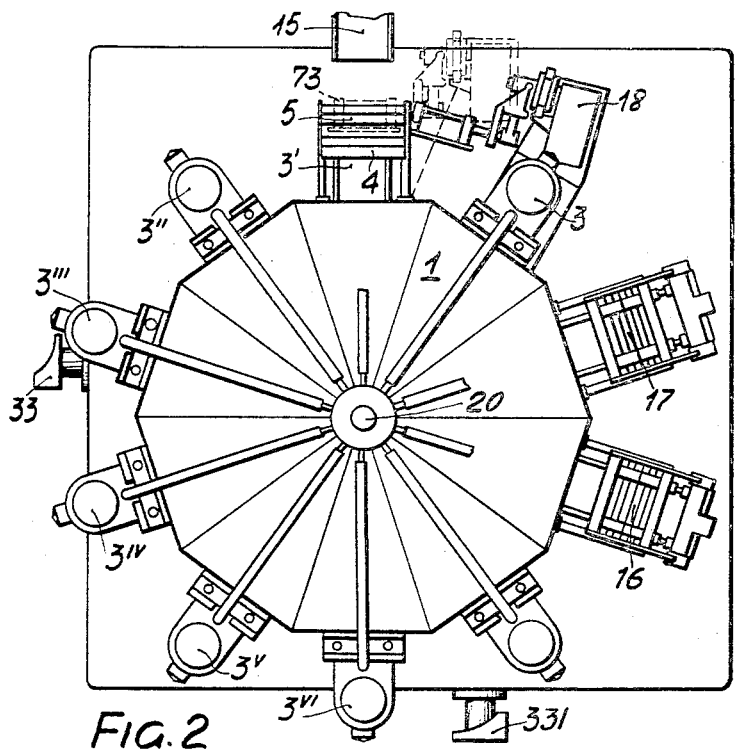
Figure 3:
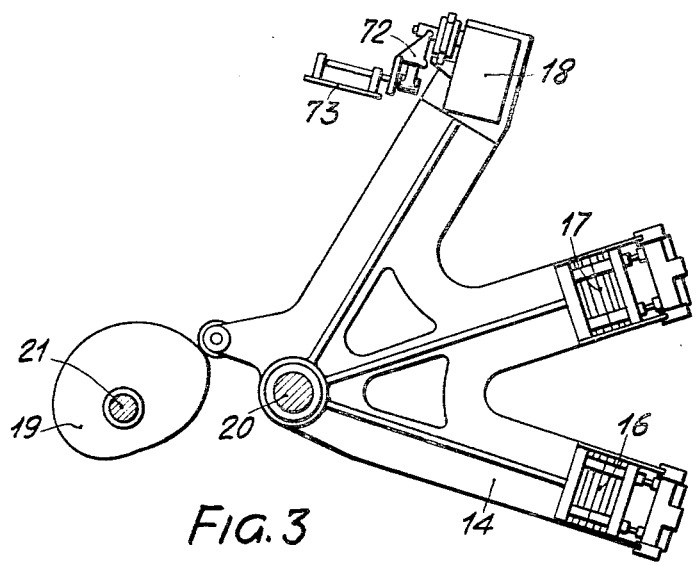
Figure 4:
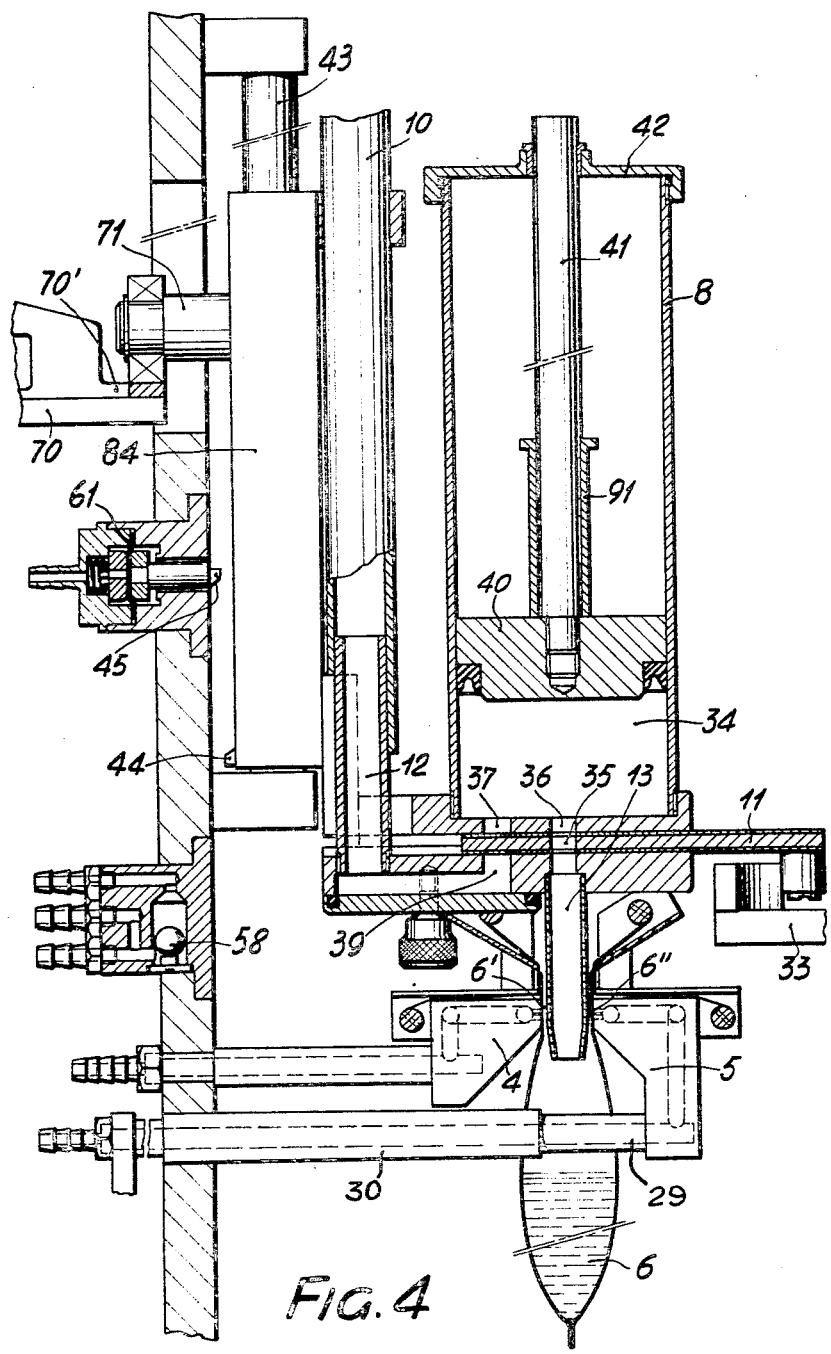
Figure 8:
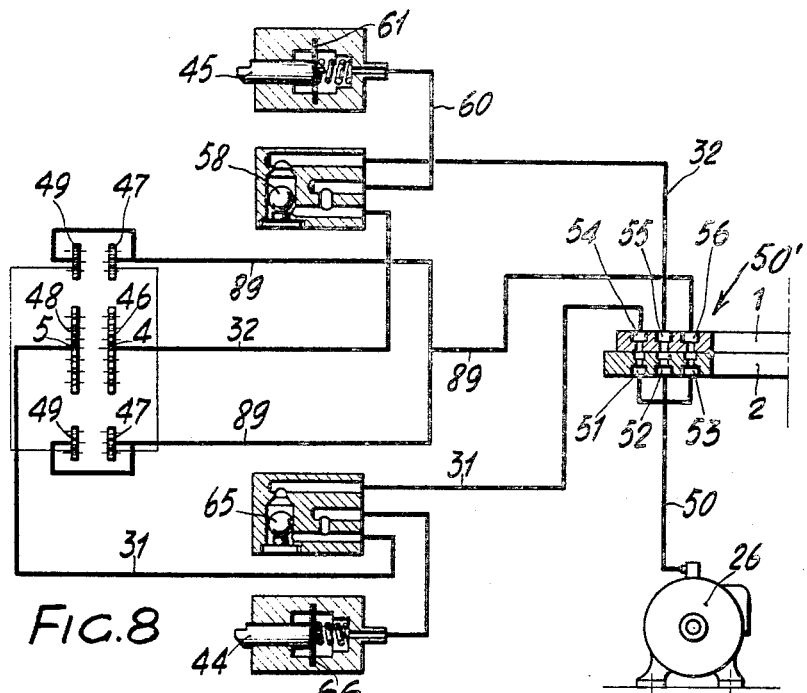
Figure 7:
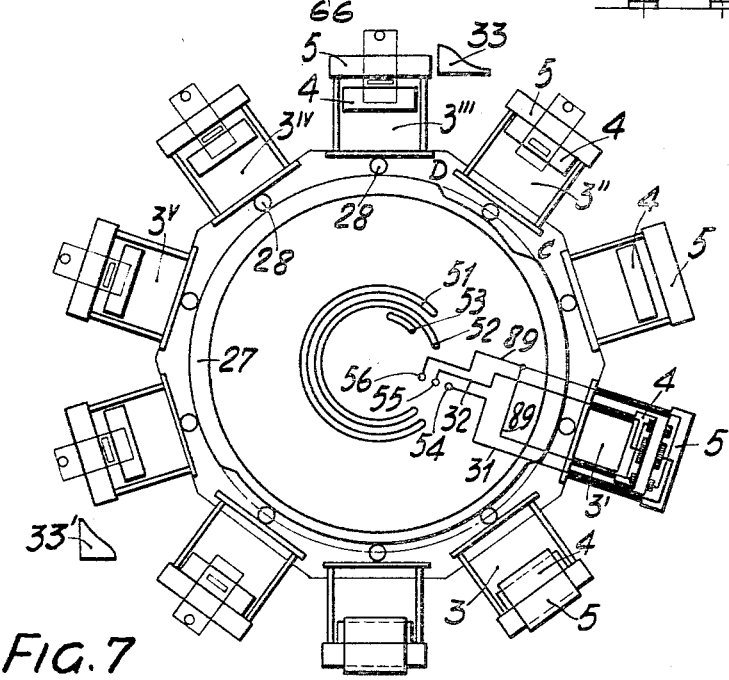

FIG. 1 is an axially sectional elevation of the apparatus of the invention;
FIG. 2 is a fragmentary plan view of the same;
FIG. 3 is a plan view of the oscillating rocker;
FIG. 4 is an elevational section of a metering pump and associated elements of a filling station;
FIG. 5 shows a jaw member for gripping and holding a bag in elevational front view;
FIG. 6 consists of two portions 6a and 6b, and shows a pair of bag gripping jaws with associated elements of a filling station in side-elevational section;
FIG. 7 is a partly diagrammatic plan view of the filling stations and of the suction system connected to the stations in a position different from that of FIG. 2; and
FIG. 8 shows in diagram the suction system of one station.

As shown in FIGS. 1 and 2, the machine includes a turn table 1 which rotates at uniform speed about a vertical axis A–B on a stationary supporting frame 2.

The filling stations 3, 3', etc., are uniformly spaced on the periphery of the turn table. Each station is provided at its underside with two jaws 4 and 5 which may be moved toward and away from each other for engaging the edges 6', 6" of a plastic bag 6 for opening and closing the bag 6 (FIG. 4).

A piston pump 8 is mounted above each pair of jaws 4, 5, and is supplied by gravity from a tank 9 with the liquid the bags are to be filled with, such as milk, drinks, etc., through flexible tubes 10.

Each pump 8 is provided at its lower end with a selector valve 11 (FIG. 4) which slides horizontally between the illustrated position in which the valve connects an orifice 36 of the cylinder space 34 in the pump 8 with a filling nozzle 13, and another position in which it connects the space 34 through a nipple 12 and the tube 10 with the tank 9.

A rocker plate assembly 14 is arranged under the turn table 1 and carries a suction feeder 73 for empty bags 6, a heat sealing device 16 the operating elements of which are shown in more detail in FIG. 6a, a cooling device 17 for cooling the heat-sealed or welded portions of the bags, and a discharge station 18 for filled and closed bags.

The plate assembly 14 is oscillated about the stationary, vertical main shaft 20 of the machine by a cam 19 mounted on a drive shaft 21 while a pinion 22 on the top end of the shaft 21 engages a gear rim 23 of the turn table 1. A nonillustrated spring maintains contact between the cam 19 and a cam follower 19' on the rocker assembly 14, as best seen in FIG. 3. The continuously rotating shaft 21 thus rotates the turn table 1 about its vertical axis. The drive shaft 21 is actuated by the reducing transmission 25 of a motor 24. A vacuum pump 26 also is being driven by the motor 24.

The rocker plate assembly 14 moves in unison with the turn table 1 during a period which corresponds to ⅔ of the angular distance between adjacent stations, that is, to an angle of 24°. During the remaining time which corresponds to rotation of the turn table 1 through ⅓ of 36° or 12°, the assembly returns to its initial position.

The stationary frame 2 of the machine (FIG. 1) carries a cam 27 which cooperates with rollers 28 (FIGS. 6b and 7) on tubular supports 29 (FIGS. 6a–6b) for the jaws 5. The supports 29 slide in sleeves 30 on the turn table 1. The cam 27 opens and closes the jaws 4, 5.

Each tubular support 29 encloses a suction conduit 31, and each jaw 4 is provided with a similar conduit 32 for holding the edges of the bag 6 in contact with the jaws 4 and 5.

As is best seen in FIG. 6a, upright brackets 100, 101 on the jaws 4, 5 hold stainless steel plates 102, 103 which extend toward each other in an obliquely downward direction. The brackets also hold split clamping rods 104, 105 from which net-like perforated films 82, 83 of Teflon or other heat resistant anti-sticking material extend along the obliquely inclined top faces of the plates 102, 103 and around the opposite parallel lower edges of the plates 102, 103 to clamping rods 104', 105' on the jaws 4, 5.

Cams 33, 33' (FIG. 7) on the frame 2 shift each slide valve 11 (FIG. 4) back and forth between a position in which its opening 35 connects the cylinder space 34 of the associated pump 8 with the nozzle 13 so that the contents of the pump 8 flow into the bag 6 placed under the same, and a second position in which the opening 35 connects the nipple 12 through bores 37, 39 with the space 34. The pump 8 is filled, and the piston 40 of the pump is thereby raised until a sleeve 91 on the piston rod 41 abuts against a cover 42 on the pump. The length of the sleeve 91 thus determines the amount of liquid dispensed by the pump.

During filling of the bag 6, the pump 8 moves downward, and it moves upward again when the bag is filled because a roller 71 mounted on the pump travels on a cam track 70 (FIGS. 1 and 4) which is fixedly mounted on the stationary shaft 20 and has a lower portion 70' and a higher portion 70". When the pump is in the high position, a retractable abutment 44 on the tubular support 84 which carries the pump 8 and axially slides on a guide rod 43 engages a retractable detent 45 the function of which will be explained presently.

The clamping face of each jaw 4, 5 is provided with a central group of openings 46, 48 and two lateral groups of openings 47, 49, as shown in FIG. 8 and partly in FIG. 5. The central openings communicate with the suction conduits 32 or 31, and the lateral ones with a suction conduit 89 (FIGS. 7, 8). As is seen in FIG. 8, the pump 26 has a main suction conduit 50 connected with three circularly arcuate grooves 51, 52, 53 (FIGS. 7-8) in the frame 2 of the machine which are adapted to communicate with orifices 54, 55, 56 of a rotary distributing valve 50' on the turn table 1 during rotation of the latter.

When a pair of jaws 4, 5 is in position to receive a bag, the orifice 55 of the corresponding suction conduit 32 communicates with the groove 52. Air is drawn through the conduit 32 which has a check valve 58 from the central openings 46 of the jaw 4 (FIGS. 8 and 5), whereby the edges of a bag located before these openings are drawn against the openings and close the same. A vacuum is thereby established in a tube 60 connected to the valve 58. A membrane 61 attached to the detent 45 is displaced so that the pump 8 may move downward by gravity as soon as the abutment 44 is also retracted by a membrane 66 under the suction in the line 31 which is equipped with a check valve 65 (see also FIG. 4).

If a bag should not be present at the proper moment for filling, the openings 46 are not closed and the free air current drawn through the openings closes the check valve 58. The membrane 61 is not attracted and the pump 8 cannot move down into the filling position. Its contents thus cannot be spilled since the cam 33 (FIG. 7) does not engage the valve 11 (FIG. 4) in the raised position of the pump 8.

During further rotation of the turn table 1, the orifice 54 of the conduit 31 (FIGS. 7, 8) is in communication with the associated groove 51 (FIG. 7) while the jaw 5 is being closed by the cam 27. The suction applied through the conduit 31, the check valve 65 (FIG. 8) and the central suction openings 48 of the jaw 5 holds the other edge of the bag. At the same time, the orifice 56 of a conduit 89 is aligned with the groove 53 (FIGS. 7-8) so that suction is applied to the lateral openings 47, 49 of the jaws (FIG. 8).

When the jaws are almost closed, the vacuum holds the bag's edges on both sides and over their whole length. At this moment the bag starts opening slowly since the portion C-D of the cam 27 (FIG. 7) has a very small inclination. External air may therefore pentrate into the bag to expand the same.

When the bag's edges have moved apart slightly, the orifice 56 looses contact with the groove 53 (FIGS. 7, 8) and the lateral openings 47, 49 of the jaws are gradually exposed while the central openings 46, 48 remain closed as the opening of the bag gradually assumes an elliptical cross section. Rapid opening movement of the jaws and therefore of the bag starts at this very moment.

If the bag does not open, external air drawn through the openings 48 closes the valve 65 and prevents the membrane 66 from withdrawing the abutment 44 so that the pump 8 cannot be lowered and the valve 11 is not opened.

The machine operates as follows: A bag 6 is drawn from a stack 15 of empty bags (FIGS. 1, 2) by the suction feeder 73 (FIG. 3) which is reciprocated by a drive 72, and is placed between the jaws 4, 5 of each filling station temporarily aligned with the suction feeder 73 while the station approaches the 12 o'clock position at 3' in FIG. 2 in a counterclockwise direction. The suction at the openings 46, 47 (FIG. 5) of the jaw 4 holds the edge 6' of the bag while the suction of the feeder is being stopped.

When the above-mentioned station reaches the position shown at 3" in FIG. 2 during the counterclockwise movement of the turntable, the section C-D of the cam 27 (FIG. 7) causes moving apart of the jaws 4, 5 and opening of the bag 6 so that it may receive the nozzle 13.

The jaws first open slowly and then more rapidly. In the first phase the edges of the bag are held by suction both at their central openings 46, 47 and the lateral openings 48, 49 while, in the second phase, suction through the openings 47, 49 is discontinued as has been explained before.

The valve 11 of the pump 8 then is displaced by the cam 33 for discharge of a precisely metered volume of liquid from the cylinder space 34 into the bag 6. The valve 11 is shifted to its original position by the cam 33' (FIG. 2) for again filling the space 34 after the filled bag passed the position 3$^{VI}$ and while the pump 8 is raised to the higher track portion 70.

The welding device 16 (FIGS. 2, 3, 6a) has two jaws 75, 76 (FIG. 6a) which are moved toward and away from each other on the rocker assembly 14 by a cam mechanism 7 on the drive shaft 21 and are heated by means of electrical resistance elements 78, 79 that are contained in bores of the jaws.

As is best seen in FIG. 6a, the free edge of the bag 6 is gripped between the edges of the stainless steel plates 102, 103, when the jaws 4, 5 are closed. The jaws 75, 76, in approaching the bag 6 from opposite directions, tension the Teflon films 82, 83 until the condition of the apparatus shown in FIG. 6a is reached. The two opposite walls of the bag 6 are welded to each other by the heat of the jaws 75, 76 within approximately one second, and the welding jaws then are quickly withdrawn. The Teflon films 82, 83 facilitate release of the jaws 75, 76 from the hot thermoplastic material of the bag 6, while the very edges of the bag are held between the edges of the plates 102, 103 which prevent the edges from being heated to fusion. As is seen in FIG. 6a, narrow air gaps thermally insulate the plates 102, 103 and the clamping jaws 4, 5 from the welding jaws 75, 76 in all positions of the latter.

The welded bag is moved to the cooling device 17 having jaws substantially identical with the jaws 75, 76 and pressed against the freshly welded portions by the cam mechanism 7 to cool them down immediately. These cooling jaws are provided with cooling water which flows through bores corresponding to the bores holding the heating elements 78, 79 in the welding device 16.

The machine of the invention is provided with a control mechanism, including automatic switches, microcontacts, and the like which perform the various operations automatically in a manner not directly relevant to the invention.

The bags 6 are thus sequentially transferred from the stack 15 to respective filling stations while the same are in position 3', and while the feeder 73 is held in the position indicated by broken lines in FIG. 2 in the terminal counter-clockwise position of the rocker plate assembly 14. Each bag is being opened by the jaws 4, 5 while the associated fillingstation moves toward the position 3''' in which the valve 11 is opened by the cam 33 to let metered liquid from the cylinder 8 of the filling station flow into the bag (see FIG. 4). Liquid flow terminates at or before the position $3^{VI}$, and the valve 11 is thereafter shifted by the cam 33' to the position in which a new batch of liquid is admitted to the cylinder 8 from the tank 9.

The bag 6 is closed by the jaws 4, 5 while it enters the heat sealing device 16 on the rocker plate 14 where it is welded shut between the jaws 75, 76 (see FIG. 6a). The rocker plate 14 moves with the turntable 1 during the welding operation through an arc of 24° from the position shown in FIG. 2, and returns clockwise to the illustrated position for receiving the next bag 6 while the previously sealed bag enters the cooling station 17.

The cooling station moves with the bag during the next counterclockwise stroke of the rocker plate 14, and then releases the bag with its cooled heat seal for discharge by the jaws 4, 5 over the discharge device 18. The empty filling station proceeds to position 3' to receive an empty bag from the stack 15.

What is claimed is:

1. An apparatus for filling plastic bags with metered amounts of material, and for closing the filled bags in automatic operation comprising, in combination:
  (a) a support;
  (b) a turn table mounted on said support for rotation about a vertical axis;
  (c) drive means for rotating said turn table at a uniform speed;
  (d) a plurality of filling stations circumferentially spaced on said turn table, each filling station including:
   (1) two jaw members movable toward and away from each other for gripping a bag therebetween, each jaw member being formed with a plurality of suction openings,
   (2) operating means for moving said jaw members toward and away from each other in timed sequence in response to said rotation of said turn table;
   (3) suction means for drawing air inward through said suction openings,
   (4) metering means including a container adapted to receive a predetermined amount of said material, discharge nozzle means for discharging the material received in said container into a bag held by said suction means on said jaw members while the same are spaced apart, and valve means for alternatingly connecting said container to a source of said material and to said nozzle means;
  (e) cam means engageable with said valve means for operating the same in response to rotation of said turn table;
  (f) a rocker member mounted on said support for rocking movement about said axis;
  (g) bag feeding means, bag welding means, bag cooling means, and bag discharging means on said rocker member for respectively feeding empty bags to said jaw members, welding the top of a filled bag, and cooling the welded bag while held by said jaw members, and discharging the cooled, filled bag from said filling stations;
  (h) oscillating means for pivoting said rocker member about said axis in such a manner that the rocker member moves in unison with said turn table during one stroke of the oscillating movement thereof; and
  (i) control means for controlling said suction means in response to said rotation of said turn table.

2. An apparatus as set forth in claim 1, wherein each of said jaw members has a face formed with a plurality of openings therein, said openings being arranged in an elongated area of said face in three longitudinally offset groups, said suction means including a first suction conduit communicating with the central one of said groups, a second suction conduit communicating with the two longitudinally terminal groups of said openings, and a suction pump, said control means being interposed between said pump and said suction conduits for connecting the same to said pump in timed sequence, said operating means including means for moving said jaw members apart at first slowly and then more rapidly, said control means being operative for connecting said three groups of openings to said pump when said jaw members move apart slowly, and for connecting only said central group of openings to said pump when said jaw members move apart more rapidly.

3. An apparatus as set forth in claim 1, wherein said metering means include a cylinder, a piston movably received in said cylinder and defining a space therein, and means for limiting movement of said piston outward of said space; a source of a liquid material arranged above said cylinder for gravity flow of said liquid into said cylinder, said valve means being interposed between said source and said space; the apparatus further comprising means responsive to said rotation of the turn table for axially moving said cylinder toward and away from an operative position adjacent said jaw members, said valve means being secured to said cylinder and engageable by said cam means only when said cylinder is in said operative position thereof; abutment means on said cylinder; and detent means on said turn table cooperating with said abutment means and operatively connected to said suction means for preventing movement of said cylinder into the operative position thereof when said openings are in free communication with the ambient air.

4. An apparatus as set forth in claim 1, wherein said welding means includes two jaws movable toward and away from each other and heating means for heating said jaws.

5. An apparatus as set forth in claim 4, further comprising coating means on the jaws of said welding means for preventing sticking of said plastic bag to said jaws.

6. An apparatus as set forth in claim 4, wherein said jaw members are arranged to grip a portion of said bag offset from the edge of the bag in a predetermined direction, the apparatus further comprising plate means on each of said jaw members for gripping said edge therebetween when said portion of the bag is gripped between said jaw members, and a film of a heat-resistant antisticking material extending over respective gripping portions of each jaw member and of the associated plate means, said film being interposed between said portions of the jaw member and the plate means when a bag is gripped.

7. An apparatus as set forth in claim 1, wherein said oscillating means include a cam member engaging said rocker member and operatively connected to said drive means.

References Cited

UNITED STATES PATENTS

| | | | |
|---|---|---|---|
| 2,267,880 | 12/1944 | Vogt | 53—272 |
| 2,689,073 | 9/1954 | Twigg | 53—187 |
| 3,112,777 | 12/1963 | Lohse | 53—187 X |

TRAVIS S. McGEHEE, *Primary Examiner.*